United States Patent

[11] 3,582,097

| [72] | Inventor | Alton D. Elliott, Jr.<br>2304 Anandale Road S. E., Huntsville, Ala. 35801 |
|---|---|---|
| [21] | Appl. No. | 862,833 |
| [22] | Filed | Oct. 1, 1969 |
| [45] | Patented | June 1, 1971 |

[54] TOOL-HOLDING CHUCK
6 Claims, 12 Drawing Figs.

[52] U.S. Cl. ........................... 279/61, 279/102
[51] Int. Cl. ........................... B23b 31/06, B23b 31/10
[50] Field of Search ........................... 279/60, 61, 62, 64, 65, 1 B, IME, IT, 102, 103, 107, 122, IE, 9.1

[56] References Cited
UNITED STATES PATENTS

| 637,772 | 1899 | Eilers | 279/122X |
| 1,318,090 | 1919 | Knebel | 279/64 |
| 2,043,598 | 1936 | Subia | 279/9AX |

Primary Examiner—Andrew R. Juhasz
Assistant Examiner—James F. Coan
Attorney—C. A. Phillips ABSTRACT: A tool-holding chuck wherein the jaws of the chuck may be finally tightened by a cam which is operated by a sector gear which has a threaded outer surface. This gear is in turn operated by a threaded collar or sleeve rotatably supported on the chuck by a fixed supporting member between stops which prevent longitudinal movement of the sleeve and thus enable operation of the cam when the threaded collar or sleeve is rotated.

Alton D. Elliott Jr.,
INVENTOR

BY C. A. Phillips
ATTORNEY

Alton D. Elliott Jr.,
INVENTOR

BY
C. A. Phillips
ATTORNEY

Alton D. Elliott Jr.,
INVENTOR

BY

C. A. Phillips
ATTORNEY

TOOL-HOLDING CHUCK

This invention relates to tool-holding devices normally referred to as chucks and particularly to chucks of the type used on electric hand drills.

The overwhelming number of drill chucks being marketed today are of a type commonly referred to as Jacob chucks. Chucks of this type are very effective but have certain disadvantages. First, and foremost, the final tightening of the jaws of this type chuck require a wrench, key, or special tool, and second, it is necessary to rotate the barrel of the chuck, often several turns, in order to significantly change the diameter of accommodation of the jaws of the chuck. In addition, a recommended procedure is to tighten by operating the key from three separate positions.

The necessity of a special wrench requires, as a practical matter, that the wrench be fastened to the drill or carried on the person of the operator. If it is fastened to the drill, usually by a cord, it is often in the way. If carried about by the operator it is most susceptible to being temporarily misplaced or lost. When lost there is the problem that a replacement chuck wrench of the precise size and configuration of the lost one may not be readily available.

The other disadvantage, that of having to substantially rotate the barrel of the drill chuck to change from one size drill bit to another, is also significant. This particularly so when changes are frequent as in such case the drill setup time can well approach or exceed actual drilling time.

Accordingly, it is an object of this invention to provide an improved tool-holding chuck which does not require a special wrench.

It is a further object of this invention to provide a new and improved chuck, which by means of a built-in tightening assembly, a tool may be clamped in the chuck with a force equal to or greater than possible when the same force is applied to a chuck wrench coupled to a conventional chuck.

It is a still further object of this invention to provide a chuck with respect to which drill bits or tools may be inserted and removed without the necessity of substantial hand movements or adjustments.

It is a still further object of this invention to provide a chuck which is capable of holding a larger tool size for a given size chuck.

In accordance with the invention a conventionally shaped, tapered, chuck jaw housing encloses a plurality of normally at least three jaws for holding a drill bit or other tool. The jaws are longitudinally supported by the basic frame of the chuck and as the housing is longitudinally moved with respect to the jaws, the latter provides a varying diameter accommodation for tools. The jaw housing couples to an intermediate coupling member by means of cooperative locking surfaces. The locking surfaces are arranged so that the jaw housing may interlock at predetermined steps which provide longitudinal adjustments of the jaw housing with respect to the intermediate coupling member and thereby, coarse adjustment diameter of jaws accommodation. The intermediate coupling member is coupled to the basic frame of the chuck through a cam, the position of the cam being variable to provide a fine adjustment of the longitudinal position of the intermediate coupling member with respect to the frame and thus fine adjustment of the setting of the jaws. The cam is operated through a highly levered arrangement including an eccentric arm in the form of a sector gear on a shaft with the cam. This eccentric arm is rotated by means of a threaded surface on the end of the arm, which is engaged by a threaded sleeve, the sleeve being rotated to effect eccentric arm and thus cam rotation. In operation, with the cam in a relieved position the jaw housing is rotated a few degrees to disengage the interlocked housing and intermediate member locking surfaces. Drill bit or other tool is then inserted and the housing pushed forward the intermediate member until an approximate fit of the jaws with respect to the tool is achieved. The housing is again rotated a few degrees which reengages the locking surfaces. Finally, the cam is rotated by means of the threaded sleeve and eccentric arm until the cam moves sufficiently to firmly lock the jaws against the drill bit.

These and other objects, features and advantages of this invention will become more apparent from the following description when considered together with the drawings in which.

Figure 1:
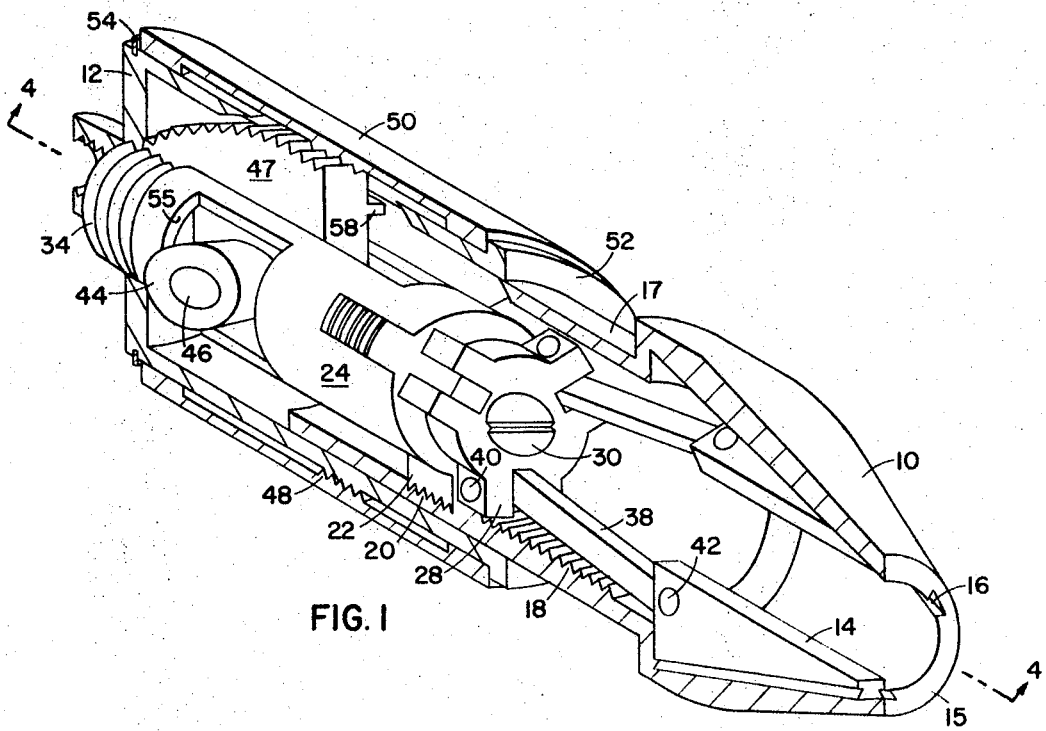
FIG. 1 is a perspective view, partly in section, of a chuck constructed in accordance with this invention.
Figure 3:
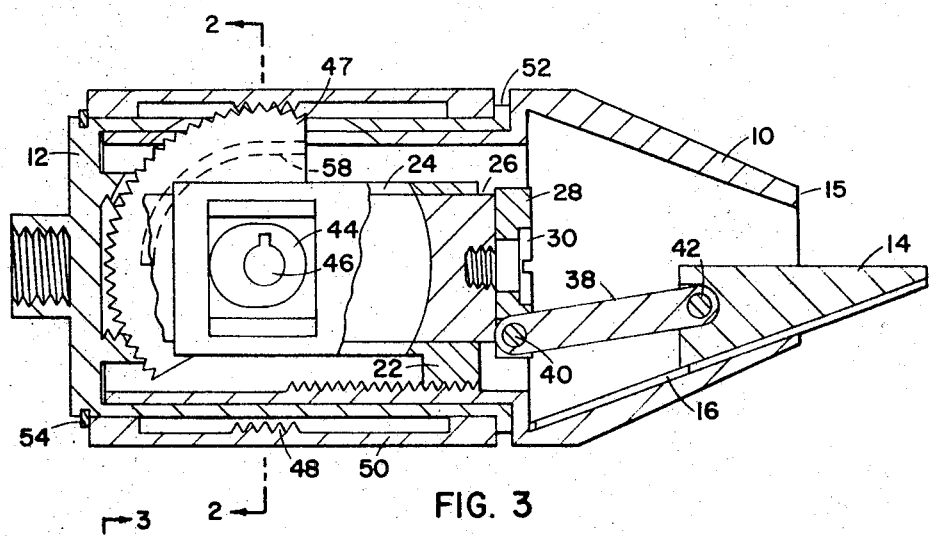
FIG. 3 is a sectional view of the whole chuck of FIG. 1 taken from a position illustrated by lines 3-3 of FIG. 2.
Figure 2:
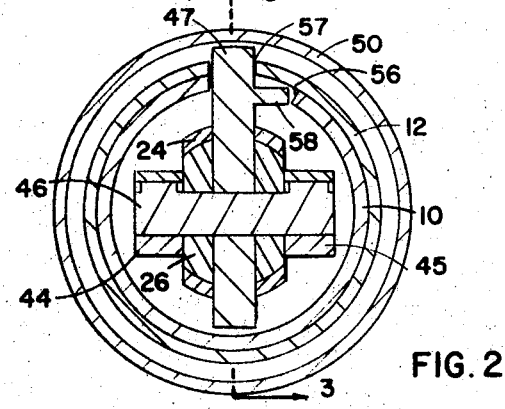
FIG. 2 is a sectional view along the lines of 2-2 of FIG. 3.
Figure 4:
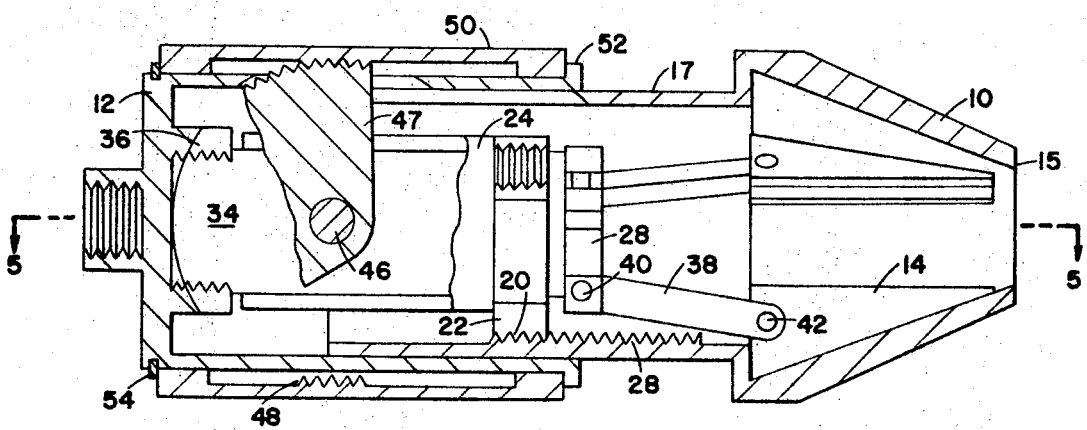
FIG. 4 is a sectional view of the whole chuck of FIG. 1 taken from a position illustrated by lines 4-4 of FIG. 1.
Figure 5:
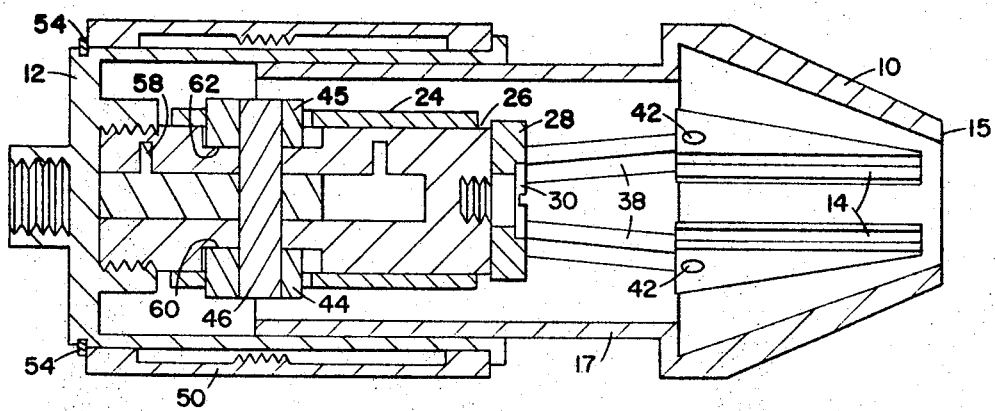
FIG. 5 is a sectional view of the whole chuck of FIG. 1 taken from a position illustrated by lines 5-5 of FIG. 1.
Figure 9:
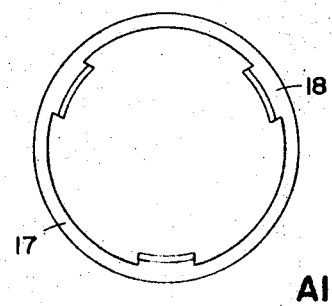
FIG. 9 is a sectional view along lines 9-9 of FIG. 8.
Figure 8:
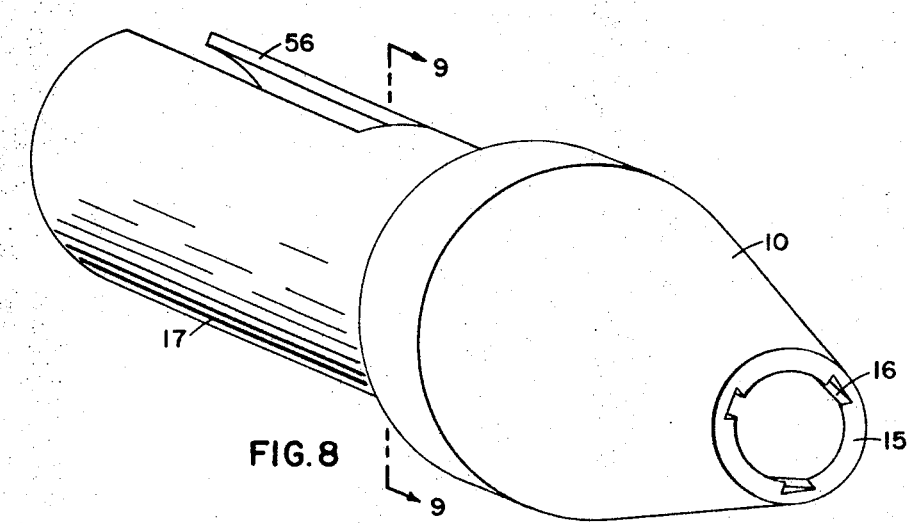
FIG. 8 is a perspective view of a chuck housing assembly.

Referring now to the drawings, and particularly to FIGS. 1—3, the fundamental structure of the chuck shown consists of jaw housing 10 (FIG. 8), frame 12 and jaws 14. The diameter of grip of jaws 14 is determined by relative longitudinal position of jaws 14 with respect to jaw housing 10, the jaws being longitudinally referenced to frame 12. Thus at the outset it is well to note that the function of the chuck of this invention is to effect the relative movement between jaws and jaw housing more conveniently and effectively. Jaw housing 10 has a tapered interior enlarging inward from open end 15 into a tool 13 (FIG. 6) to be held is inserted. Jaws 14, which have a generally triangular shape, travel in locking grooves 16 and are radially supported by the tapered interior. The result is that jaws 14 vary their diameter of grip as jaw housing 10 is moved longitudinally. To the rear of jaw housing 10 and integral therewith is adjustable housing support 17 (FIGS. 8 and 9) which includes on an interior surface three spaced sets of locking threads, ridges or teeth 18 (FIGS. a and 3). They are adapted to mate and lock with a corresponding set of threads or teeth 20 on risers 22 of sleeve 24 on which jaw housing 10 is adjustably mounted. By this combination, jaw housing 10 may be readily adjusted longitudinally with respect to sleeve 24 by merely twisting jaw housing 10 to a "nonengaged" relation with respect to sleeve 24, then moving housing 10 in or out until jaws 14 are at a desired position and then reengaging threads 18 of housing 10 in threads 20 of sleeve 24. There is an additional setting which must be made before this can be done which will be discussed below.

Figure 7:
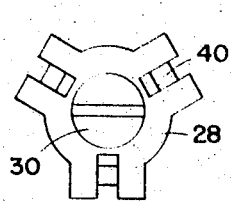
FIG. 7 is an end view of a spider assembly which serves to longitudinally support, through appropriate linkages, the jaws of the chuck.
Figure 10:
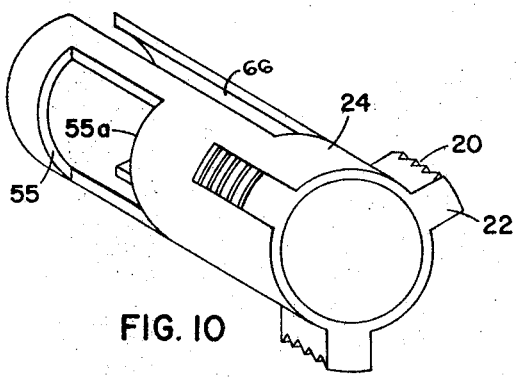
FIG. 10 is a perspective view of a sleeve assembly adapted to longitudinally support the housing assembly shown in FIG. 8.
Figure 11:
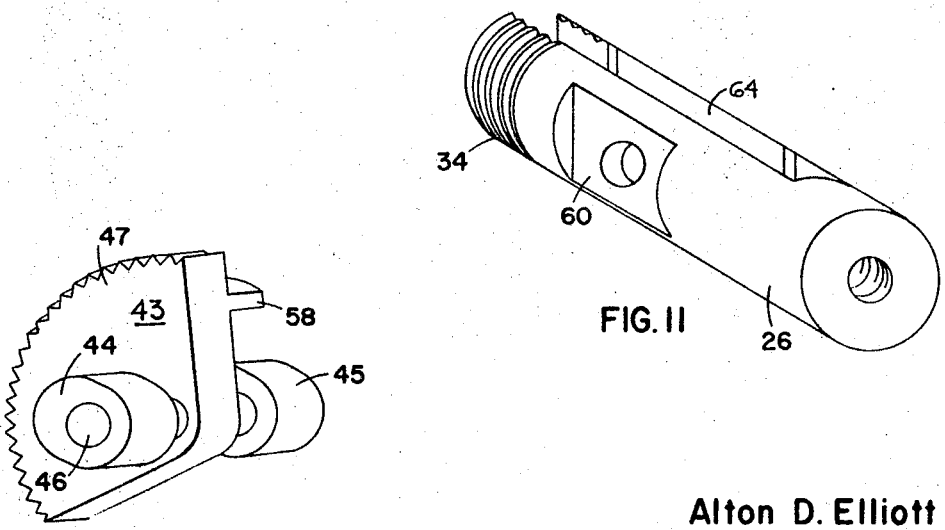
FIG. 11 is a perspective view of a bolt assembly adapted to support the sleeve assembly shown in FIG. 9.

Sleeve 24 (FIG. 10) is supported on bolt 26 (FIG. 11) and spider 28 (FIG. 7) is secured to bolt 26 by screw 30. Screw 30 has a shoulder 32 which positions screw 30 to permit rotation of spider 28 with respect to bolt 26 to provide a rotatable support for jaws 14 as will be explained. Bolt 26 is rigidly attached to frame 12 by means of threaded portion 34 screwed into the rear portion 36 of frame 12. Linkages 38 interconnect, through pins 40 and 42, spider 28 and jaws 14 to in effect provide a movable coupling between jaws 14 and frame 12 which permits the jaws to vary their spacing, and thus diameter of grip, but be provided a longitudinal support once a setting has been made. In addition, since jaws 14 must rotate with jaw housing 10, spider 28 rotates permitting free rotation of the whole assembly including jaw housing 10, jaws 14, linkages 38 and spider 28.

Figure 12:
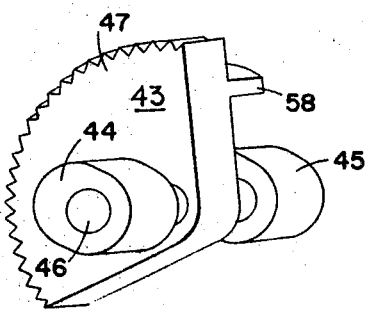
FIG. 12 is a perspective view of the chuck cam assembly.

Find adjustment for purposes of tightening and loosening the grip of the chuck is provided by cam assembly 43 (FIG. 12) consisting of identical cams 44 and 45, shaft 46 and sector gear 47, cams 44 and 45 and sector gear 47 being eccentrically mounted on and keyed to shaft 46, with sector gear 47 having a substantially longer effective lever arm than cams 44 and 45. Sector gear 47 is operated or driven by a threaded inner portion 48 of an outer sleeve 50 which engages threads 52 of sector gear 47. Outer sleeve 50 is longitudinally secured on frame 12 by a shoulder 52 and locking ring 54 and thus sleeve 50 applies a levered force to cam 42 through threaded surfaces 48 and 52. The force is applied between frame 12 and shaft 46, shaft 46 being rotatably mounted on bolt 26, which in turn is affixed to frame 12. By rotating outer sleeve 50 in a direction to turn sector gear 47 and cams 44 and 45 counterclockwise to a position as shown in FIG. 1, cams 44 and 45 apply force against rear face regions 55 on both sides of inner sleeve 24, to move sleeve 24 inward, to the left. The causes jaw housing 10 to be pulled in, to the left, causing jaws 14 to contract. The movement is small but highly levered, allowing a substantial tightening force to be applied to a tool 13 when placed in the open end or mouth 15 of jaw housing 10.

Adjustable housing support 17 of jaw housing 10 includes a slot or groove 56, and frame 12 includes a slot 57, into which sector gear 47 is moved when sector gear 47 is rotated counterclockwise for a maximum compression between bolt 26 and sleeve 24 (position shown in FIG. 1). When in this position, and by virtue of locking pawl 58, an integral part of sector gear 47, jaw housing 10 is locked in an engaged position on sleeve 24 which prevents jaws 14 from unintentional disengagement. Actually pawl 58 prevents jaw housing 10 from rotating and interlocking threads 18 and 20 from being unintentionally disengaged.

Rotating sleeve 50 in a direction to rotate sector gear 47 clockwise causes cams 44 and 45 to contact opposite or front faces 55a of sleeve 24 (FIG. 10) and thus loosening the chuck jaws. Then with gear 47 and pawl 58 out of groove 56, jaw housing 10 may be rotated, as desired, to reset its position with respect to sleeve 24. Cams 44 and 45 abut plane surfaces 60 and 62 of bolt 26 and sector gear 47 is centrally positioned and operated in slot 64 of bolt 26. A matching slot 66 is in sleeve 24.

Figure 6:
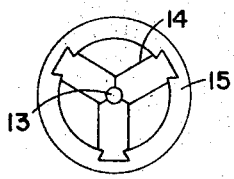
FIG. 6 is a fragmentary view of the end of the chuck into which a tool is inserted and showing a tool of smallest diameter clamped in place.

To go over the operation of the chuck, assume that the position of the components are as illustrated in FIG. 1 and it is desired to bring the jaws closer together in order to accommodate a smaller drill or other tool. First, sleeve 50 is rotated to cause sector gear 47 and cams 44 and 45 to be rotated clockwise sufficient for pawl 58 to be withdrawn from groove 56. This permits jaw housing 10 to be rotated sufficiently counterclockwise to disengage threaded interlocking regions 18 and 20 and thus permit jaw housing 10 to be moved inward, to the left, and thus to cause jaws 14 to move in a closing direction. When moved to a desired position, as indicated by the maximum inward position of housing 10 which, for a given tool, will permit interlocking engagement of locking regions 18 and 20, housing 10 is again rotated to engage it with sleeve 24. Finally, sleeve 50 is rotated in a direction to rotate sector gear 47 clockwise tightening cams 44 and 45, that is causing cams 44 and 45 to pull sleeve 24, and thus housing 10, inward to the left, causing jaws 14 to be compressed to tighten the jaws against a tool 13 (FIG. 6). This rotation of sector gear 47 also moves pawl 58 back into a locked position.

Having thus described my invention, I claim:
1. A tool-holding chuck comprising:
   A. a jaw housing assembly comprising:
      1. a jaw housing having an interior of increasing dimension extending from an open end of said housing, said open end being adapted to receive a tool to be held by said chuck, and
      2. a plurality of locking means positioned and adapted to support and lock said housing on and to housing support means;
   B. a plurality of jaws adapted to slidably engage the said tapered surfaces of said jaw housing and to provide a varying dimension griping surface for tools as said jaws and said housing are relatively moved, longitudinally, in engagement;
   C. a frame member;
   D. jaw-supporting means for coupling said jaws to said frame member and supporting said jaws with respect to said jaw housing;
   E. housing support means for supporting said jaw housing assembly including locking means positioned and adapted to interlock with said locking means of said jaw housing assembly when aligned and engaged therewith and providing longitudinal adjustment of said housing with respect to said housing support means when said locking means are disengaged; and
   F. lever means for coupling, and varying the longitudinal relation between said jaws and jaw housing; Whereby coarse adjustment of said jaws is accomplished by moving said housing with respect to said housing support means when in a disengaged relation and a fine adjustment and final tightening of said jaws is accomplished by operating said lever means with said housing support means in an engaged position.

2. A tool-holding chuck as set forth in claim 1 wherein said lever means includes:
   A. at least one cam eccentrically mounted on said frame member;
   B. cam-operating means comprising:
      1. an eccentrically mounted arm coupled to said cam for operating said cam, said arm having a threaded end surface, and
      2. a threaded sleeve supported by said frame member and positioned to be rotated in engagement with said threaded end surface of said arm whereby said arm is rotated about its eccentric axis; Whereby the rotation of said threaded sleeve accomplishes final tightening of said jaws.

3. A tool-holding chuck as set forth in claim 2 wherein said cam means comprises means for varying the longitudinal relation between said housing support means and said frame member.

4. A tool-holding chuck as set forth in claim 3 wherein:
   A. said plurality of locking means of said housing assembly comprises at least three sets of locking means spaced about the periphery of a portion of said housing assembly, each said locking means comprising a plurality of parallel rows of ridges and the peripheral spacing between locking means being at least equal to the length of a ridge; and
   B. said locking means of said housing support means comprising a matching set of ridges adapted to interlock with said ridges of said housing assembly whereby said housing assembly is supported on said housing support means when said locking means are in engagement and said locking means may be disengaged by rotating said housing assembly with respect to said housing support means.

5. A tool-holding chuck as set forth in claim 4 wherein:
   A. said frame member includes a bolt rigidly supported at one end;
   B. said housing support means comprises a sleeve mounted on said bolt; and
   C. said cam means comprises means for varying the longitudinal relation between said bolt and said sleeve.

6. A tool-holding chuck as set forth in claim 5 wherein:
   A. said jaw housing assembly includes a slot; and
   B. said eccentrically mounted arm of said cam-operating means includes a pawl mounted on the side of said arm and wherein said arm and said pawl interlock in said slot when said chuck is in a tightened posture whereby said housing assembly is locked from rotation with respect to said sleeve of said housing support means preventing disengagement of said jaw housing assembly from said housing support means.